United States Patent [19]
Masheder

[11] 3,945,398
[45] Mar. 23, 1976

[54] CHECK VALVES

[76] Inventor: Henry Masheder, 13 Well Walk, Hampstead, London, NW3, England

[22] Filed: July 11, 1974

[21] Appl. No.: 487,666

Related U.S. Application Data

[63] Continuation-in-part of Ser. No. 375,006, June 29, 1973, abandoned, which is a continuation of Ser. No. 280,178, Aug. 14, 1972, abandoned, which is a continuation of Ser. No. 43,847, June 5, 1970, abandoned.

[52] U.S. Cl. .............................................. 137/527.8
[51] Int. Cl.² ......................................... F16K 15/02
[58] Field of Search ........................... 137/527, 527.8

[56] References Cited
UNITED STATES PATENTS

| 215,887 | 4/1879 | Crossman et al. ............... 137/527.8 |
| 1,707,942 | 4/1929 | Petit ................................. 137/527.8 |
| 1,744,798 | 1/1930 | Price ................................. 137/527 |
| 2,273,118 | 2/1942 | Langdon .......................... 137/527.8 |
| 2,711,188 | 6/1955 | Nickerson ........................ 137/527.8 |
| 2,900,998 | 8/1959 | Lortz .............................. 137/527.8 X |
| 3,290,001 | 12/1966 | Taylor ............................. 137/527.8 X |
| 3,448,465 | 6/1969 | Pierce et al. .................... 137/527.8 X |

Primary Examiner—Robert G. Nilson
Attorney, Agent, or Firm—Imirie, Smiley & Linn

[57] ABSTRACT

The invention provides an unbalanced, butterfly check valve including a hollow main body member having a frusto-conical valve seat disposed interiorly therein, and a valve closure member in the form of a generally circular plate having a frusto-conical periphery conforming to the valve seat; the valve closure member is disposed for pivotal movement about an axis normal to the axis of the main body member and laterally offset from the center thereof. The center of gravity of the valve closure member biases the same to the closed position and is located such that the torque required to open the valve decreases as the closure member moves from its closed position to its open position. The closure member may be also fluid-dynamically profiled so as to remain open in response to a minimum flow condition and to rapidly become closed upon the occurrence in a change in flow direction.

12 Claims, 6 Drawing Figures

CHECK VALVES

CROSS-REFERENCE TO RELATED APPLICATIONS

This is a continuation-in-part of application Ser. No. 375,006, filed June 29, 1973, now abandoned, which is a continuation of application Ser. No. 280,178, filed Aug. 14, 1972, now abandoned, which is a continuation of application Ser. No. 43,847, filed June 5, 1970, now abandoned.

BACKGROUND OF THE INVENTION

1. FIELD OF THE INVENTION

This invention relates to improvements in check valves, such as those suitable for use with high velocity, high pressure fluid systems, and more particularly, to such valve assemblies having a valve closure element exhibiting improved operating characteristics and fluid dynamic response.

2. DESCRIPTION OF THE PRIOR ART

Various types of check valves, butterfly valves and the like, have long been well known and are used in many diversified applications. For these different applications, the valve assemblies range from those which are extremely small and made of lightweight material, such as plastic and aluminum, to those which are quite massive in size and are made of cast metal. While such larger valve assemblies are inherently more difficult to handle, both large and small check valves exhibit certain common characteristics and have certain desirable features the attainment of which has presented serious problems to the valve engineer, as well as the ultimate user.

For example, valve assemblies heretofore available have typically exhibited characteristics such that the valve closure members thereof tend to oscillate and, in certain cases, cause rapid deterioration and failure in operation. Also, check valves of the prior art have failed to recognize the fluid dynamics involved in a valving operation and often seriously impede fluid flow even in the desired direction. While early attempts to remedy some of these deficiencies as well as many others have resulted in improved valve designs, a check valve assembly having a design which takes into consideration the dynamics of fluid flowing therethrough and has a natural tendency to resist oscillation has heretofore been unavailable.

In considering the prior art, it may be illustrative to briefly trace the history of the development of the modern check valve. Initially, it was felt that the easiest way to produce a check valve would be to provide a flat, annular seat whose axis coincides with that of a flow path, such as that within a pipe, and to additionally provide a circular flat plate for cooperation with the flat seat. The flat plate closure member was then typically journaled for rotation about an axis normal to the axis of the valve seat and placed outside the flow path, typically on or about the periphery of the seat. In this manner, forward flow would force the flat plate to open away from the annular seat and reverse flow would cause the plate to firmly engage the seat thereby closing the valve.

While the foregoing valve arrangement was believed to be a satisfactory solution, it was soon recognized that the same exhibited a serious disadvantageous characteristic, namely, under steady flow conditions the valve tended to oscillate causing severe damage to the valve seat during operation. Of course, it should be further appreciated that this oscillation of the valve plate often had destructive consequences especially in cases where the valve closure member itself had a three or four foot diameter and weighed approximately 1000 pounds. The natural solution to this problem was to equip the valve assembly with an appropriate damping mechanism; however, this obviously increased the cost and complexity of the overall system and treated the symptoms rather than the problem.

The valve engineer, in attempting to overcome the problems outlined above, moved to a second generation check valve of the type exemplified by U.S. Pat. No. 1,744,798. This type of valve arrangement moved the axis of rotation of the valve member from its position adjacent or outside the periphery of the valve seat to a position within the valve seat but slightly offset from the valve center line. This, of course, had an affect in reducing the high torque required to maintain the valve closure member in a fully open position, but nevertheless failed to eliminate the oscillation problem exhibited by previously available devices. Moreover, the oscillation problem became even more critical since the second generation check valves had a frusto-conical seat designed to provide a direct metal-to-metal contact with a conforming frusto-conical edge of the closure member. This arrangement requires that critical tolerances be maintained, and such tolerances are incapable of being continuously met under conditions where oscillation of the valve exists. Again, it became necessary to equip these valves with damping arrangements in order to reduce the oscillations and maintain the valves in proper working condition.

While the foregoing development of check valves resulted in certain improvements, it failed to provide a fully satisfactory assembly which eliminated the need for an associated damping mechanism. This is due primarily to the fact that prior to the present invention, the check valve designs of the prior art did not take into consideration the fluid dynamics which exist in a situation requiring the provision of a check valve and, in fact, exhibited the reverse characteristics to those normally desired. In other words, when the valve is closed, a high pressure differential exists across the closure member while no flow occurs; on the other hand, with the valve open, no pressure differential exists while a high flow situation is established. Thus, the fluid pressure available to perform work is maximum when the valve is closed and decreases to a minimum when the valve is fully opened. The prior art valve exhibited characteristics such that the torque required to initially open the same was small and increased to a rather large value. It can therefore be appreciated that the fluid pressure was at its minimum point when the prior art valves necessitated that the maximum torque be exerted. The present invention has thus recognized the essential or basic problem which has plagued the prior art in producing valves which oscillate in operation, and has provided an effective solution to the problem in the form of a valve design in which the torque necessary to open the valve decreases, rather than increases, as the same opens from its closed position.

SUMMARY OF THE INVENTION

It is therefore an object of the present invention to construct a valve assembly having a valve closure member which exhibits a center of gravity such that the torque required to open the same decreases as the valve member moves from its closed position to its open position.

The present invention may be summarized in that there is provided a check valve of the butterfly type constructed in accordance with the geometrical principle that the center of gravity of the valve member must remain on the same side of a vertical plane bisecting the valve member pivotal axis both when the valve member is fully closed and when it is fully open. Specifically, there is provided a check valve in which the closure member is free to rotate about a substantially horizontal axis from a fully open position parallel to the valve bore axis to a closed position perpendicular to the valve bore, with the closure member having a shorter one of its two wings made heavier than its longer wing so that it assumes the closed position when there is no fluid flow through the valve bore.

Preferably the bore of the valve body is so shaped that the periphery of the longer wing of the closure member passes in close proximity to the interior of the bore in moving from the closed position over a considerable arc of movement. In this way, fluid pressure tending to open the valve is virtually contained in front of the longer wing over an initial movement from the closed position and thus applies a desirable large opening torque. The extra weight of the shorter wing of the closure member is preferably derived from a thickening of the profile of that number, giving it an airfoil configuration.

The present invention may be summarized in that a valve assembly includes a hollow, main body member having a frusto-conical valve seat disposed interiorally therein, and a valve member in the form of a generally circular disc having a frusto-conical periphery conforming to the valve seat, the valve being disposed for pivotal movement about an axis normal to the axis of the main body member but offset from the transverse center thereof, and having a center of gravity located such that the torque required to open the valve decreases as the valve moves from its closed position to its open position.

The present invention exhibits numerous material advantages over the prior art in that it has fluid dynamic characteristics which closely match those existing within the valve, that valve oscillation is eliminated without the use of complex and expensive damping mechanisms, and that torque requirements for opening the valve are substantially independent of the size of the valve assembly or the weight of the various component parts thereof.

Other objects and advantages of the present invention will become apparent from the following description of the preferred embodiments when taken in conjunction with the accompanying drawings.

DESCRIPTION OF THE PREFERRED EMBODIMENT

Figure 2:
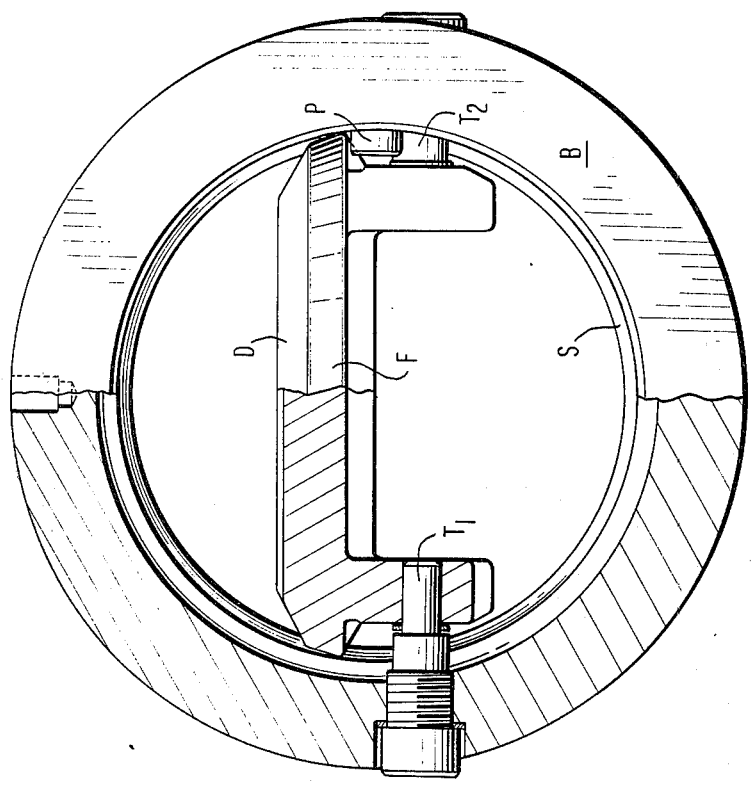
FIG. 2 is an end elevational view, partially in section, of the valve of FIG. 1.
Figure 1:
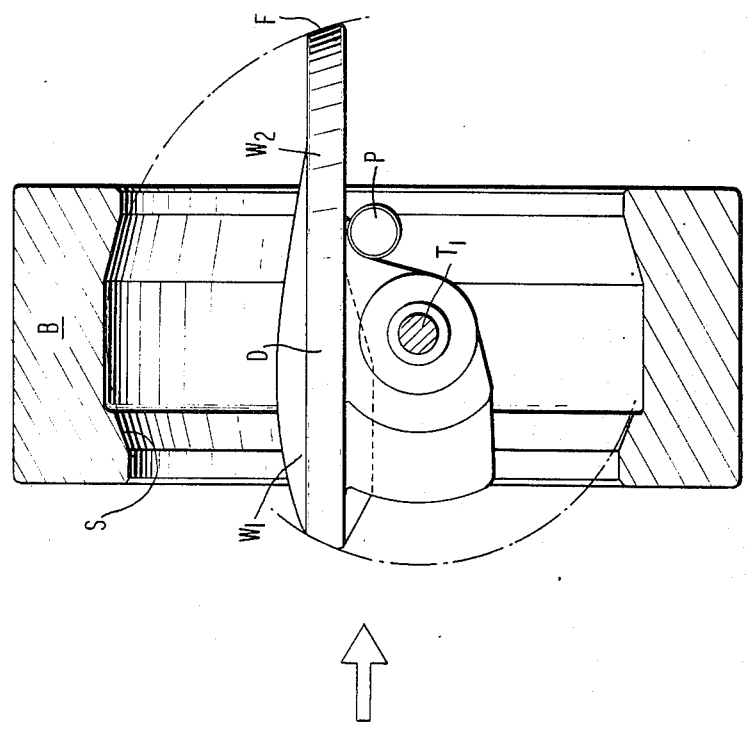
FIG. 1 is a central vertical sectional view of a valve assembly in accordance with the present invention in the open position.

Referring now to FIGS. 1 and 2, a first embodiment of a valve assembly according to the present invention includes a hollow, main body member B formed with a frusto-conical seat S for engagement by complimentary frusto-conical face F of a valve closure disc D, which is journaled at each side for free pivotal movement on trunions $T_1$ and $T_2$, respectively. Trunions $T_1$ and $T_2$ have a common horizontal axis which is located, normal to the axis of seat S, in a position slightly displaced or offset from the valve center line or true diameter a distance less than the radius of the valve disc D such that the disc has shorter and longer wings $W_1$ and $W_2$, respectively, and is adapted to progressively move into firm, sealing engagement with the seat as the disc is rotated from open to closed positions. Pins P protruding from main body number B into the generally cylindrical bore therein act as stops to define the fully open position of the valve, parallel to the axis of the valve body bore.

Figure 6:
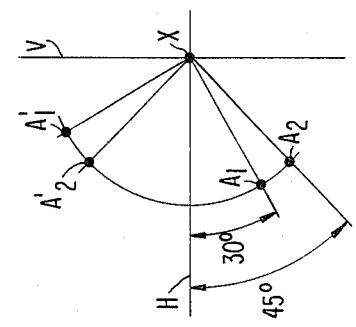
FIG. 6 is a graphical representation of the focus of the center of gravity of the valve members of the present invention.
Figure 5:
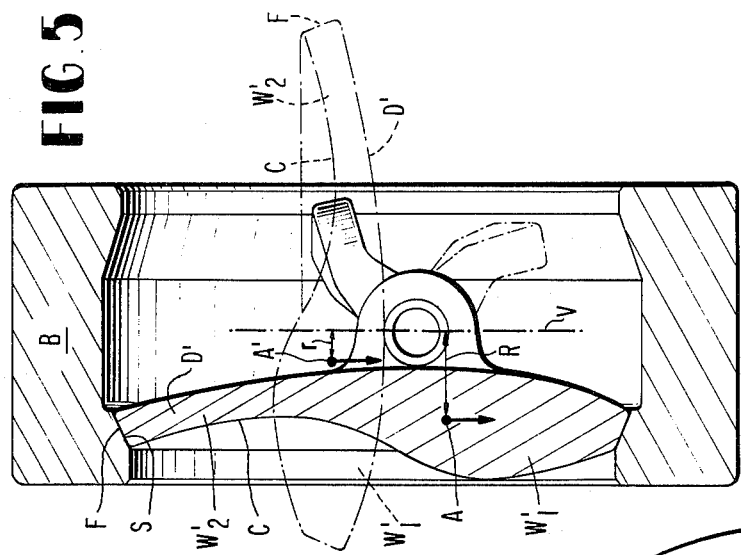
FIG. 5 is a diagrammatic sectional view illustrating the torque variation characteristic of the valves of the present invention.

The shorter wing $W_1$ of the disc closure member D can be seen to have a thicker profile and is thus heavier than the tail or longer wing $W_2$, so that the valve normally assumes the closed position. The center of gravity A, FIGS. 5 and 6, is preferably disposed within a segment of about 30° to 45° below the horizontal plane H bisecting the axis of trunions $T_1$ and $T_2$, such disposition producing superior results in operation. The valve body B is internally sculptured or cut out over its upper part in such a manner that the periphery of the upper or longer wing $W_2$ of the closure member D traverses an arc, indicated in phantom lines, which is in close proximity to the inner surface of the main body B through the first 45° of the disc's full 90° travel from closed to open positions. The axis of rotation of the disc is disposed with respect to the angle defined by the frusto-conical seat S and the width of the seat such that the closure member D drops by tilting movement truly into and lifts by reversed movement accurately from the seat without any rubbing action.

In the closed position, the pressure differential across the valve disc D acts upon the longer wing $W_2$ to tend to open the disc and also acts against the shorter wing $W_1$ to tend to close the disc. In view of the larger area of the longer wing $W_2$ compared with the shorter wing $W_1$, a net torque is developed which tends to cause the valve D to open to the position illustrated in FIG. 1. The net opening torque is greater than the inherent closing torque provided by the center of gravity A, FIGS. 5 and 6, being located within the shorter wing $W_1$. Once the valve is opened, the fluid flow across the opened disc D causes it to remain open since the flow stream acts continuously over the larger upper wing $W_2$ to apply a strong opening force.

If the once established flow should cease, the heavier, shorter wing $W_1$ will cause the development of a closing torque thereby resulting in disc D being rotated back to its closed position. Furthermore, if the flow should reverse in direction, the center of gravity developed closing torque will be further assisted by the large fluid dynamic reverse torque caused by the fluid reaction against the larger wing $W_2$ in the reverse direction. The overall geometry outlined, gives the valve a rapid snap opening and smooth, progressive, slam-free closure movement enabling it to be used on all modern, high velocity, high pressure systems. In addition, the valve assembly of the present invention has inherent self-cleaning action because sediment, sludge, etc. which tends to settle in front of the lower wing $W_1$, is moved by the sweeping forward motion of wing $W_1$ when the valve opens. Thus, the present valve assembly can be used with contaminated fluids without damage.

Figure 4:
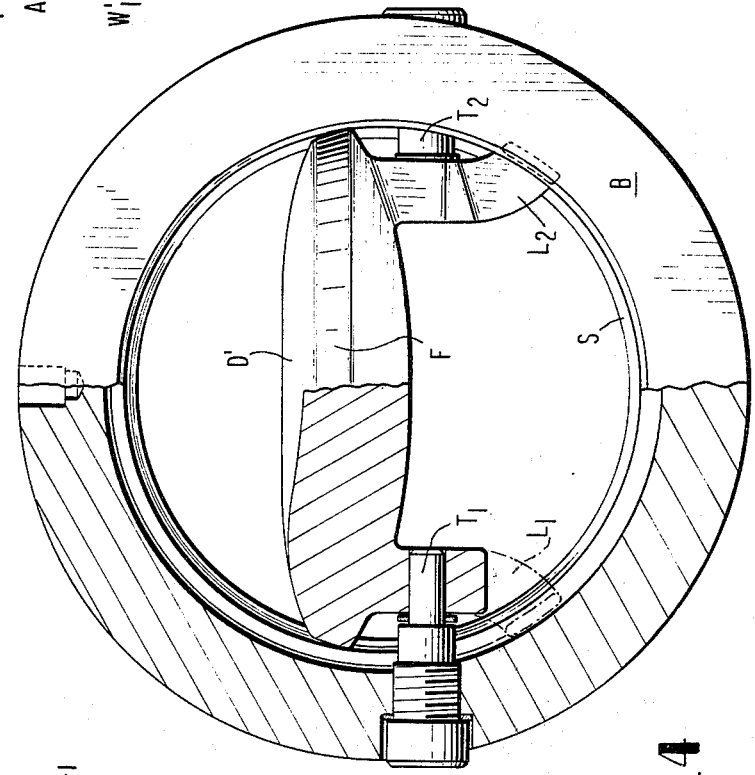
FIG. 4 is an end elevational view, partially in section, of the valve of FIG. 3.
Figure 3:
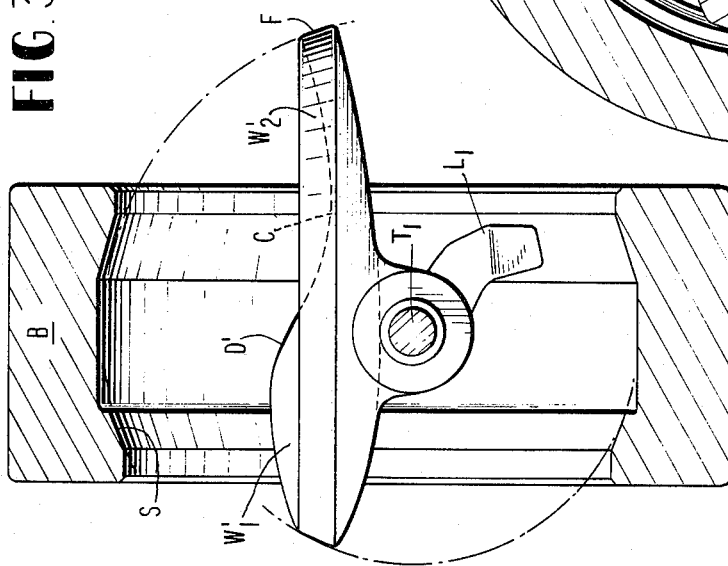
FIG. 3 is a central vertical sectional view of another embodiment of the valve assembly of the present invention in the open position.

Referring to FIGS. 3 and 4, an alternative embodiment is illustrated, wherein identical or primed characters are used to identify corresponding parts to those of the embodiment of FIGS. 1 and 2. In the embodiment of FIGS. 3 and 4, there is disposed within main body member B a valve disc D' which has a heavier, thickened profile shorter wing $W_1'$, giving it an aerodynamic shape not unlike that of an aircraft wing. The trailing larger wing $W_2'$ of the disc D' is upwardly bowed or inclined so as to create a shallow concave pocket C in such larger wing. Member D' thus has a convex bottom surface, and defines an upper surface having a leading portion which is convex and a trailing portion which is concave. In addition to the aerodynamic or airfoil configuration of the disc D', the pins P of the embodiment of FIGS. 1 and 2 are replaced by a pair of legs $L_1$ and $L_2$ protruding rearwardly and slightly outwardly from each of the bearings journaled on trunions $T_1$ and $T_2$, respectively. Legs $L_1$ and $L_2$ are adapted to cooperate with an interior surface of the bore of main body member B to define the limit or open positon of the disc D'.

The operation of the valve assembly of FIGS. 3 and 4 is identical to that of the embodiment of FIGS. 1 and 2 with the exception that the airfoil shape of the disc D' exhibits certain advantageous characteristics when used with certain types of fluids and fluid flow conditions. The valve assembly of FIGS. 3 and 4 is particularly well suited when rapid action is desired and control is necessary for extremely low fluid flow rates where the flow stream maintaining the valve open is relatively weak. The airfoil shape of the valve disc D' acts to keep the valve open and, if the flow should reverse, causes a more rapid closing movement. It is to be noted that such rapid closing action is due not only to the inclined nature of the larger wing $W_2'$ of the valve disc D' but further due to the negative pressure caused by reverse flow past the concave pocket C.

The essential principles of operation of the valve assemblies FIGS. 1 through 4 may be more fully appreciated with reference to the diagrammatic sectional view of FIG. 5. When the valve is in the closed position, shown in solid lines, the center of gravity of the closure member will be at point A and will act over a distance R to develop an initial torque which tends to keep the valve disc closed. This biasing force must be overcome by the pressure differential acting against the valve disc if it is desired to open the valve and develop a fluid flow therethrough. Once the valve is opened, as shown in dashed lines, the center of gravity of the disc closure member will have moved to point A' and will thereafter act over a lesser distance r to produce a lesser torque to bias the valve toward its closed position.

It can be appreciated that since the weight of the valve closure member does not change, the torque tending to bias the valve closed is greater when the valve is in its closed position (valve mass times R) and is smallest when the valve is fully opened (valve mass times r). This corresponds precisely to the fluid dynamic conditions which will be experienced by the valve in operation. In other words, when the valve disc is closed, a maximum pressure differential will exist across the valve such that the maximum opening torque will be developed by the fluid. Likewise, when the valve is fully opened, the least pressure differential will exist across the valve and the least opening torque will be available to counteract the biasing torque of the valve disc. Therefore, as the pressure differential of the fluid decreases upon opening of the valve, the torque required to maintain the valve of the present invention open likewise decreases whereupon a stable, non-oscillating situation will be maintained.

The decreasing torque characteristic described above, which, in accordance with the present invention, preclude the establishment of oscillations within the valve assembly, has never before been recognized and is the precise opposite to the principle of operation of check valves typical of the prior art. Therefore, the described embodiments, in accordance with the teachings of the present invention, structurally provide for the necessary decreasing torque to match the actual fluid dynamic characteristics of the flow stream and are considered to represent a material advance in the art.

Furthermore, and referring to FIG. 6, it has been found that a range of loci exist for the center of gravity of the valve members D and D', which produce superior results in operation. This range is defined in that the center of gravity is located on the same side of the vertical plane V bisecting the axis X of trunions $T_1$ and $T_2$ whether the valve is opened or closed. Also, the center of gravity is disposed preferably within a segment of from about 30° below the horizontal bisecting plane H (point $A_1$) but may be within a segment up to 45° below plane H (point A) when the valve member D (or D') is in the closed position. Since points $A_1$ and $A_2$ move to points $A_1'$ and $A_2'$, respectively, when the valve opens, it can be appreciated that in order to provide the valve with a decreasing torque when going from closed to open positions, the upper limit of 45° (point $A_2$) should not be reached or exceeded so as to assure that the horizontal distance of point $A_2$ from plane V will always be greater than the horizontal distance of point $A_2'$ from plane V. Likewise, the point $A_1$ should be below plane H so that the center of gravity will not pass into or beyond plane V when the valve is opened. In other words, optimum and superior results will be obtained if the center of gravity lies within a limited segment of greater than 0° (horizontal plane H) and less than 45°.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. A valve assembly comprising:
   a hollow, main body member disposed on a generally horizontal axis;
   a frusto-conical valve seat disposed interiorly of said main body member; and
   a circular closure member having a frusto-conical periphery conforming to said frusto-conical valve seat, said closure member being journalized in said main body member for rotation about a horizontal axis normal to the direction of the axis of said valve seat, said axis of rotation being displaced from a diameter of said closure member a distance less than the radius of said member, said closure member having a weight distribution such that the center of gravity thereof remains on one side of a vertical plane including said axis of rotation throughout the entire range of movement of said member and acts through a progressively decreasing moment arm as said member rotates toward a horizontal open position so as to develop a correspondingly decreasing closing, biasing torque.

2. A valve assembly according to claim 1 wherein said axis of rotation is disposed with respect to the angle defined by said frusto-conical seat and the width of said seat such that said closure member drops by tilting movement truly into and lifts by reversed movement accurately from said seat without any rubbing action.

3. A valve assembly according to claim 1 wherein the hollow interior of said main body member is shaped to closely accommodate the arc traversed by the periphery of a longer wing of said closure member over a considerable angle of movement from the closed position.

4. A valve assembly according to claim 1, wherein a shorter wing of said closure member is made heavier than the longer wing thereof by a thickening of the profile of said member giving it an airfoil configuration.

5. A valve assembly according to claim 1 wherein said closure member defines a concave pocket in a surface thereof which is at the top when said member is horizontally disposed.

6. A valve assembly according to claim 1 wherein a longer wing of said closure member is upwardly inclined when said member is horizontally disposed.

7. A valve assembly according to claim 1 wherein said closure member includes at least one protruding stop member for coaction with an interior surface of said main body member.

8. A valve assembly according to claim 1 wherein said closure member has a convex surface which is at the bottom when said member is horizontally disposed.

9. A valve assembly according to claim 1 wherein said closure member defines a surface which is at the top when said member is horizontally disposed, said surface having a leading portion which is convex and a trailing protion which is concave.

10. Valve assembly according to claim 9 wherein the surface which is at the bottom when said closure member is horizontally disposed is convex.

11. A valve assembly according to claim 1 wherein said center of gravity is located within a segment of about 30° below a horizontal plane including said axis of rotation.

12. A valve assembly according to claim 1 wherein said center of gravity is located at an angle with respect to said axis of rotation within about 45° below a horizontal plane bisecting said axis of rotation.

* * * * *